Jan. 17, 1967   E. M. C. RØRBAEK MADSEN   3,299,219
STEREOPHONIC TRANSDUCER CARTRIDGE
Filed April 8, 1963   2 Sheets-Sheet 1

3,299,219
STEREOPHONIC TRANSDUCER CARTRIDGE
Erik Markvard Christopher Rørbaek Madsen, Gimsinge-
hoje, Struer, Denmark, assignor to A/S Bang & Olufsen
Produktionsselskab, Struer, Denmark
Filed Apr. 8, 1963, Ser. No. 271,379
Claims priority, application Denmark, Nov. 10, 1958,
4,053/58
20 Claims. (Cl. 179—100.41)

This application is a continuation-in-part of application Serial No. 819,030, filed June 9, 1959, now abandoned.

The present invention relates to an electromechanical transducer or cartridge.

Such transducers or pick-ups are used in phonographs for reproduction of stereophonic and monophonic records.

It is an object of the invention to provide a transducer suitable for stereophonic and monophonic reproduction with high fidelity.

It is a further object of the invention to provide an electromechanical transducer for stereophonic and monophonic reproduction, in which distortion can be minimized by using a small dynamic stylus point mass.

Still a further object of the invention is to provide an electromechanical transducer for the purpose specified having equal stylus compliance in all directions.

Still a further object of the invention is to provide an electromechanical transducer having substantially similar frequency response for both channels of a sterephonic system.

Still a further object of the invention is to provide an electromechanical transducer having a minimum of hum sensitivity.

Still a further object of the invention is to provide a transducer having practically no magnetic attraction to a steel turntable.

Still a further object of the invention is to provide an electromagnetic type transducer having a unitary stylus and armature structure with a moving mass which is so low that no resonance occurs inside the audio range.

It is a further object of the invention to provide a moving coil type transducer or pick-up cartridge with a unitary coil and stylus structure with a small moving mass.

Still a further object of the invention is to provide a moving coil type transducer which combines the effect of a dynamic system with the effect of a magnetic system.

Figure 1:
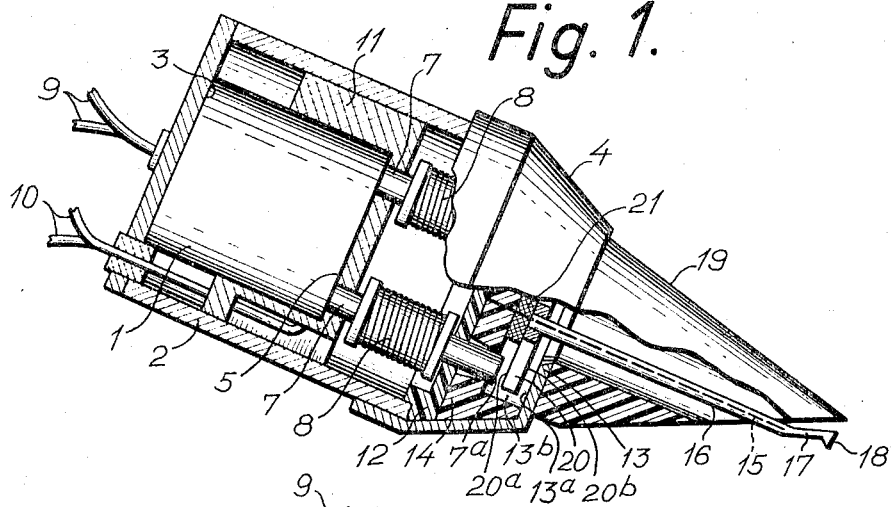
Figure 2:
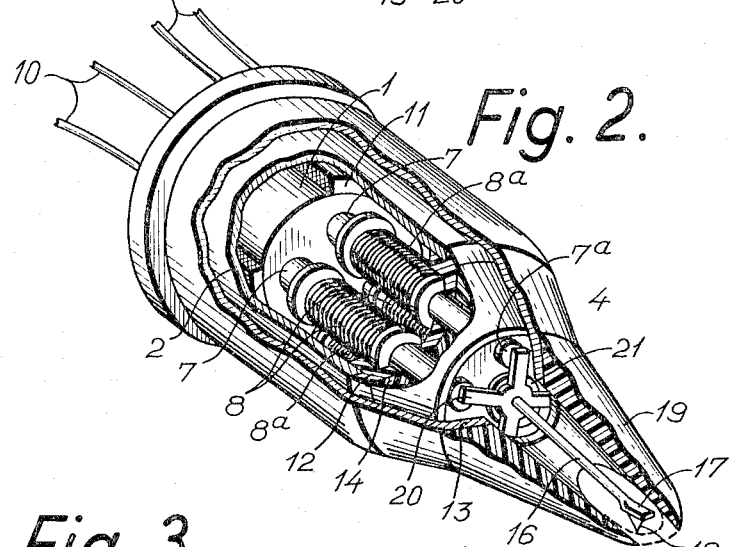
Figure 3:
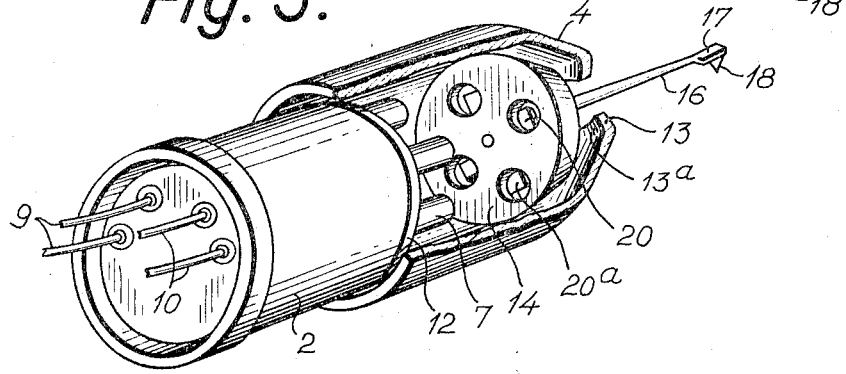
Figure 4:
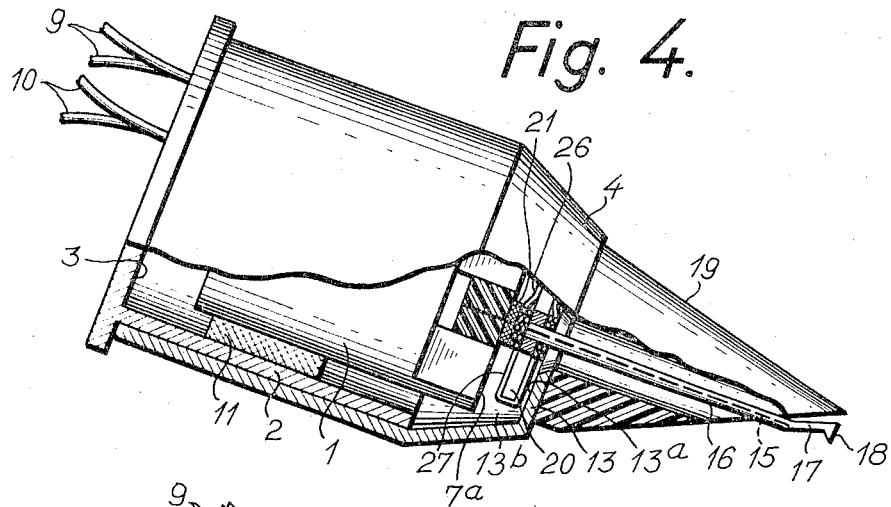
Figure 5:
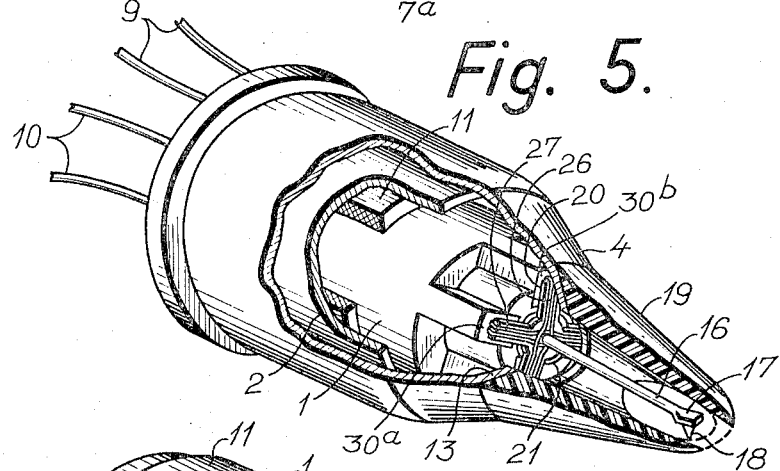
Figure 6:
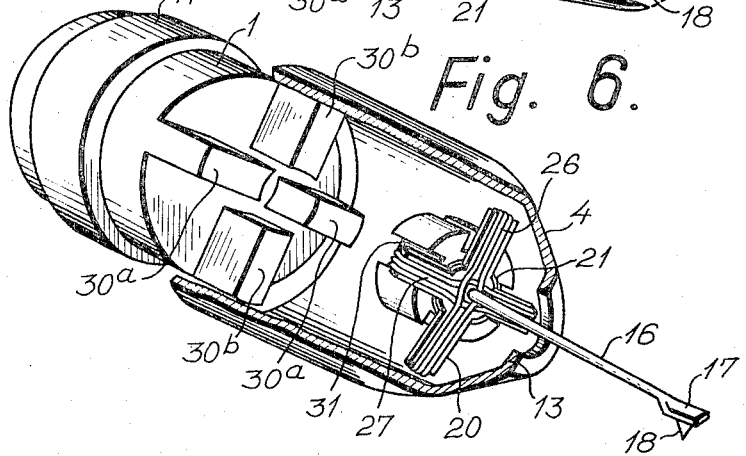

The invention will be further described in the following with reference to the accompanying drawing in which:

FIGURE 1 is a side view, partly in section, of a transducer according to the invention in one embodiment, FIGURE 2 is a perspective view, partly in section, of the transducer shown in FIGURE 1, seen from the front end, FIGURE 3 is a perspective partly exploded view of the essential parts of the transducer of FIGURES 1 and 2, FIGURE 4 is a side view, partly in section, of a transducer according to the invention in another embodiment, FIGURE 5 is a perspective view, partly in section, of the transducer of FIGURE 4 seen from the front end, and FIGURE 6 is a perspective partly exploded view of the essential parts of the transducer of FIGURES 4 and 5 seen from the front end.

In both embodiments the electromechanical transducer is of the type having a single stylus 18 adapted to track a record groove having individual sound recordings disposed substantially at right angles relative to each other. Means is provided in the form of a permanent magnet 1 for generating a magnetic field between opposite faces 7a, 13a defining therebetween a magnetic gap 13b. A structure including a stylus arm 16 and a supporting member 20 therefor which has opposite, substantially parallel surfaces 20a and 20b with the stylus arm 16 extending from the surface 20b is by means of resilient mounting means 21 mounted with the supporting member 20 in the magnetic gap 13b with its surfaces 20a, 20b substantially parallel with the opposite faces 7a, 13a of the magnetic gap.

The resilient mounting means 21 has substantially equal elastic response in all directions so as to thereby contribute to achieve substantially equal compliance factors in all directions.

In the embodiment of FIGURES 1–3 two individual coil systems 8 and 8a respectively are stationarily supported to be effectively energized in response to oscillations of the stylus arm supporting member 20 in the magnetic gap 13b in compliance with the tracking of the stylus 18 to achieve outputs from the coil systems corresponding to the individual sound recordings.

In the embodiment of FIGURES 4–6 two individual coils 26 and 27 are wound on the stylus arm supporting member substantially in symmetry with each other and with the turns in planes substantially parallel to the flux lines of the magnetic field so as to effectively energize the coils in response to oscillations of the stylus arm supporting member in the magnetic gap in compliance with the tracking of the stylus to achieve outputs from the coils corresponding to the individual sound recordings.

More specifically with reference to FIGURES 1–3, 1 is a cylindrical permanent magnet mounted in a generally cylindrical casing made from a magnetizable material and having at one end four cylindrical pole members 7 of magnetizable material located as illustrated in the drawing at the four corners of a square so as to define at their ends 7a pole faces facing the magnetic gap.

The magnetic structure is surrounded by an annular member 11 of non-magnetic material, for example an electrical insulating material by means of which the magnetic structure is held in position inside a casing which comprises a cylindrical casing member 2, a bottom 3 and a cap 4 having an inwardly extending flange 4a, the inwardly facing surface 13a of which effectively provides the opposite face of the magnetic gap, the casing structure 2, 3, 4 being of magnetizable material.

Obviously the permanent magnet will generate a magnetic field causing flux lines to flow between the pole surfaces 13b and the surface 13a across the magnetic gap.

The correct location of the pole pieces 7 is secured by means of a member 12 such as of synthetic resinous material provided with four holes for the four pole pieces 7 and fitting into the end of the cylindrical casing portion 2.

The stylus structure comprises the stylus arm 16 which may be in the form of a thin tube of a diameter of the magnitude ⅛₈″. The tube is flattened at one end at 17 which is bent at an angle relatively to the geometrical axis of the tube, and a stylus member 18 is secured adjacent the end of the flattened portion 17.

The stylus arm or tube 16 is rigidly secured to the stylus supporting member 20 which in the embodiment of FIGURES 1–3 is in the form of a magnetic armature and the unitary stylus arm and armature structure is resiliently mounted by means of a mounting member 21 to provide substantially equal elastic response in all directions.

More specifically a sub-assembly is provided comprising a generally disc-shaped member 14 of an electrical insulating maerial such as a synthetic resinous material having four holes for the passage of the ends of the pole members 7 and of a configuration fitting inside the cap 4.

The armature and stylus arm structure is secured to the mounting member 21 at the centre thereof by means of a cord or wire 15 the one end of which is secured inside the tubular stylus arm 16 and which extends through the elastic mounting member 20 and is secured in the member 21.

As shown in the drawing, the armature 20 which is made of magnetizable material is symmetrical and as apparent from the foregoing description the sub-assembly comprising the mounting member 21, the elastic member 20 and the armature structure will be centered symmetrically relatively to the four pole pieces 7 with the substantially flat armature 20 having its opposite surfaces substantially parallel with the surfaces 13a and 13b of the magnetic gap.

In the embodiment shown the armature is cruciformed with the two arms substantially perpendicular to each other with opposite ends of each of the armature arms overlying the ends of the pole members 7. As obvious from the drawings the two arms of the cruciformed armature extend substantially at 45° relatively to the flattened stylus arm portion 17 so as to thereby tilt the one arm relatively to one set of the pole member surfaces in response to 45° motion of the stylus of the left with a corresponding tilting of the other arm relatively to the surfaces of the second pair of pole member surfaces in response to 45° motion of the stylus to the right.

In order to provide for corresponding output the two individual coil systems 8 and 8a are mounted on the pole pieces and as will be obvious from the foregoing a 45° motion of the stylus to the left will induce current in the coils 8 but not in the coils 8a. The converse is true for stylus motion 45° to the right.

The opposing coils are connected in a push-pull relationship by means of output leads.

The symmetrical structural described provides for several advantages. The channel separation is very good and induction of cross talk from one channel to the other is minimized because cross talk components are in phase in opposing coils. The moving mass which only comprises the armature 20 and the stylus arm can be made very low which results in good frequency response.

Hum pick-up is very low due to the balanced coil construction and the shielding effect of the magnetic housing which provides a completely closed magnetic circuit which in addition to shielding the coil from external fields prevents attraction to steel turntables.

The elastic member 21 which is located in the zone about the central point of symmetry may be in the form of a small elastic pad of a suitable material such as synthetic or natural rubber.

The mounting of the armature and stylus structure by means of the cord provides a permanent pressure to the reslient mounting member urging the same in one direction of the magnetic field which provides for equalization in variations in the compliance of the elastic material which may occur for example in warm weather.

As will be appreciated from the foregoing description the structure is designed for mass production by mounting the armature and stylus structure on the mounting member 14 which is positioned correctly relatively to the pole members by means of the holes of the member 14 which provides complementary mounting means of the magnetic structure.

While the transducer of FIGURES 1–3 is an electromagnetic transducer, the embodiment of FIGURES 4–6 provides a dynamic or magnetic-dynamic modification.

Obviously the cruciformed armature of FIGURES 1–3 provides a member which has substantially parallel surfaces in all three dimension, i.e. the end surfaces of the two arms are perpendicular to each other.

In the embodiment of FIGURES 4–6 the magnetic structure differs from the structure of FIGURES 1–3 thereby that the pole members 7 have been omitted and the permanent magnet at the end facing the magnetic gap is cruciformed with surfaces 30a and 30b perpendicular to each other and with the coils 26 and 27 mounted perpendicular to each other on each of the arms of the cruciformed armature in symmetry with each other and with the turns in planes substantially parallel to the flux lines of the magnetic field which provides for a unitary coil structure in which the coils are located well-defined at 90° relatively to each other.

In the embodiments of FIGURES 4–6 the member 20 may be of magnetizable material but may also be of any other suitable non-magnetizable material such as synthetic resinous material.

The use of a magnetizable armature 20 has, however, the advantage that it will increase the induction in the coil. When, for example, the armature structure moves by tilting about the axis of the coil 27 only and thereby induces current in this coil, the arm which carries the coil 26 will assume an inclined position in the magnetic gap with the result that the magnetic flux through this arm will be increased which will give rise to an increased induction in the coil 27.

In FIGURES 4–5 the housing structure in which the magnet is supported is equivalent to that of FIGURES 1–3.

The armature and stylus sub-assembly are mounted on a supporting member 31 in which the cord or string 15 is secured in a similar way as in the member 14 of FIGURES 1–3 and in order to provide for positioning of the sub-assembly correctly relatively to the cruciformed pole pieces the member 31 is provided with projections between which cruciformed recesses are provided so as to provide complementary positioning means relatively to the magnetic structure in a similar way as in FIGURES 1–3.

In both embodiments described a cap 19 of synthetic resinous material or the like is secured to the casing structure to protect the stylus arm and provided with an aperture through which the stylus tip extends.

Also in the embodiments of FIGURES 4–6 the two coils have their ends connected through outlet leads 9 and 10.

It is possible within the scope of the invention to damp the movable structure by means of a suitable damping fluid such as a silicone compound filled into the magnetic gap.

It will be understood that the invention is not limited to the embodiments shown and described and that it will be possible within the scope of the invention to modify the structure in various respects. Thus for example instead of using a cruciformed armature a flat disc-shaped armature may be used.

What is claimed is:

1. In an electromechanical transducer having a single stylus adapted to track a record groove having individual sound recordings disposed substantially at right angles relative to each other in combination: a relatively stationary magnetic structure having opposite faces defining a magnetic gap and including permanent magnet means for generating a magnetic field across said magnetic gap, a relatively movable structure including a stylus arm and an armature member therefore, said armature member having opposite substantially parallel surfaces and having the stylus arm extending from one of said surfaces, means for mounting said structure with said armature member in said magnetic gap with said substantially parallel surfaces substantially parallel with the opposite faces of said magnetic gap, said mounting means including resilient means providing substantially equal elastic response of said relatively movable structure in all directions, first induction coil means and second induction coil means included in said transducer to provide individual energization of said first and said second coil means respectively in response to oscillations of said armature member in said magnetic gap in compliance with the tracking of the stylus to selectively achieve outputs from said coil means corresponding to said individual sound recordings.

2. In an electromechanical transducer having a single stylus adapted to track a record groove having individual sound recordings disposed substantially at right angles relative to each other in combination: a magnetic structure having opposite faces defining a magnetic gap and a permanent magnet means for generating a magnetic field across said magnetic gap, stylus structure including a stylus arm supporting an armature member, said armature member having opposite substantially parallel surfaces and said stylus structure being substantially in symmetry with respect to a central point and having the stylus arm extending from one of said surfaces, means for mounting said structure movable relative to said magnetic structure with said armature member in said magnetic gap with said substantially parallel surfaces substantially parallel with the opposite faces of said magnetic gap, said mounting means including resilient means providing substantially equal elastic response of said stylus structure in all directions, first induction coil means and second induction coil means included in said transducer to provide individual energization of said first and said second coil means respectively in response to oscillations of said armature member in said magnetic gap in compliance with the tracking of the stylus to selectively achieve outputs from said coil means corresponding to said individual sound recordings.

3. In an electromechanical transducer having a single stylus adapted to track a record groove having individual sound recordings disposed substantially at right angles relative to each other in combination: a magnetic structure having opposite faces defining a magnetic gap and permanent magnet means for generating a magnetic field across said magnetic gap, a stylus structure including a stylus arm supporting an armature member, said armature member having opposite substantially parallel surfaces and said stylus structure being substantially in symmetry with respect to a central point and having the stylus arm extending from one of said surfaces, means for mounting said structure movable relative to said magnetic structure with said armature member in said magnetic gap with said substantially parallel surfaces substantially parallel with the opposite faces of said magnetic gap, said mounting means including an elastic pad located in a zone about said central point of symmetry and providing substantially equal elastic response of said stylus structure in all directions, first induction and second induction coil means included in said transducer to provide individual energization of said first and said second coil means respectively in response to oscillations of said armature member in said magnetic gap in compliance with the tracking of the stylus to selectively achieve outputs from said coil means corresponding to said individual sound recordings.

4. In an electromechanical transducer having a single stylus adapted to track a record groove having individual sound recordings disposed substantially at right angles relative to each other in combination: a magnetic structure having opposite faces defining a magnetic gap and including permanent magnet means for generating a magnetic field across said magnetic gap, a stylus structure including a stylus arm and an armature member, said armature member having opposite substantially parallel surfaces and having the stylus arm opposite extending from one of said surfaces, means for mounting said stylus structure movable relative to said magnetic structure with said armature member in said magnetic gap with said substantially parallel surfaces substantially parallel with the opposite faces of said magnetic gap, said mounting means including resilient means providing substantially equal elastic response of said stylus structure in all directions, means for imparting a permanent pressure on said resilient means in one direction of said magnetic field, first induction coil means and second induction coil means included in said transducer to provide individual energization of said first and said second coil means respectively in response to oscillations of said armature member in said magnetic gap in compliance with the tracking of the stylus to selectively achieve outputs from said coil means corresponding to said individual sound recordings.

5. In an electromechanical transducer having a single stylus adapted to track a record groove having individual sound recordings disposed substantially at right angles relative to each other in combination: an electromagnetic structure including a magnetic structure having opposite faces defining a magnetic gap and permanent magnet means for generating a magnetic field between said opposite faces of said magnetic gap and two individual coil systems selectively energizable in response to variations of said magnetic field, an armature structure including an armature of magnetisable material having opposite, substantially flat and parallel surfaces and a stylus arm carrying said stylus extending from one of said surfaces, and means for mounting said armature structure movable relative to said magnetic structure with said armature located in said magnetic gap with its substantially parallel surfaces substantially parallel with the opposite faces of said magnetic gap including resilient means operable to render said magnetic field variable in response to oscillations of said armature, said resilient means providing substantially equal elastic response of the armature structure in all directions to render said variations of said magnetic field operable to selectively energise said coil systems in response to oscillations of the armature structure in compliance with the tracking of the stylus to achieve outputs from said coil systems corresponding to the individual sound recordings.

6. In an electromechanical transducer having a single stylus adapted to track a record groove having individual sound recordings disposed substantially at right angles relative to each other in combination: an electromagnetic structure including a magnetic structure having opposite faces defining a magnetic gap and permanent magnet means for generating a magnetic field between said opposite faces of said magnetic gap and two individual coil systems selectively energisable in response to variations of said magnetic field, an armature structure including an armature of magnetisable material having opposite, substantially flat and parallel surfaces and being substantially in symmetry with respect to a central point and a stylus arm carrying said stylus extending from one of said surfaces, and means for mounting said armature structure movable relative to said magnetic structure with said armature in said magnetic gap with its substantially parallel surfaces substantially parallel with the opposite faces of said magnetic gap including resilient means operable to render said magnetic field variable in response to oscillations of said armature, said resilient means providing substantially equal elastic response of the armature structure in all directions to render said variations of said magnetic field operable to selectively energise said coil systems in response to oscillations of the armature structure in compliance with the tracking of the stylus to achieve outputs from said coil systems corresponding to the individual sound recordings.

7. In an electromechanical transducer having a single stylus adapted to track a record groove having individual sound recordings disposed substantially at right angles relative to each other in combination: an electromagnetic structure including a magnetic structure having opposite faces defining a magnetic gap and permanent magnet means for generating a magnetic field between said opposite faces of said magnetic gap and two individual coil systems selectively energisable in response to variations of said magnetic field, an armature structure including a substantially flat cruciformed armature of magnetisable material with two arms intersecting at a central point and a stylus arm carrying said stylus extending from said central point and means for mounting said armature structure movable relative to said electromagnetic structure with said armature in said magnetic gap with its substantially parallel surfaces substantially parallel with the opposite faces of said magnetic gap including resilient means operable to render said magnetic field variable in response to oscillations of said armature, said resilient means providing substantially equal elastic response of the armature structure in all directions to render said variations of said magnetic field operable to selectvely energise said coil systems in response to oscillations of the armature structure in compliance with the tracking of the stylus to achieve outputs from said coil systems corresponding to the individual sound recordings.

8. In an electromechanical transducer of the type having a single stylus adapted to track a record groove having individual sound recordings disposed substantially at right angles relative to each other in combination: an electromagnetic structure having portions defining opposite faces of a magnetic gap having a central point and permanent magnet means for generating a magnetic field across said magnetic gap and two pairs of coils located substantially in symmetry with respect to said central point and being selectively energisable in response to variations of said magnetic field, an armature structure including a substantially flat cruciformed armature of magnetisable material having two arms intersecting at a central point and a stylus arm carrying said stylus extending from said central point, and means for mounting said cruciformed armature movable in said magnetic gap with the central point of said gap substantially coinciding with the central point of said armature and with said arms of said arms of said cruciformed armature opposite each of said pairs of coils, said mounting means including resilient means enabling said armature to tilt in said magnetic gap for varying said magnetic field and providing substantially equal elastic response of the armature structure in all directions to render said variations of said magnetic field operable to selectively energise each of said coil pairs in response to oscillations of the armature structure in compliance with the tracking of the stylus to achieve outputs from said coil pairs corresponding to the individual sound recordings.

9. In an electromechanical transducer of the type having a single stylus adapted to track a record groove having individual sound recordings disposed substantially at right angles relative to each other in combination: an electromagnetic structure having a first portion including four pole members mounted in substantially square configuration and a second portion opposite said pole members defining therewith a magnetic gap having a central point of symmetry with respect to said pole members, permanent magnet means for generating a magnetic field across said magnetic gap and two pairs of coils mounted on diametrically opposite pole members being selectively energisable in response to variations of said magnetic field, an armature structure including a substantially flat cruciformed armature of magnetisable material having two arms intersecting at a central point and a stylus arm carrying said stylus extending from said central point, and means for movably mounting said cruciformed armature in said magnetic gap with the central point of said gap substantially coinciding with the central point of said armature and with said arms of said cruciformed armature opposite each of said pairs of coils, said mounting means including resilient means enabling said armature to tilt in said magnetic gap for varying said magnetic field and providing substantially equal elastic response of the armature structure in all directions to render said variations of said magnetic field operable to selectively energize each of said coil pairs in response to oscillations of the armature structure in compliance with the tracking of the stylus to achieve outputs from said coil pairs corresponding to the individual sound recordings.

10. In an electromechanical transducer having a single stylus adapted to track a record groove having individual sound recordings disposed substantially at right angles relative to each other in combination: an electromagnetic structure including a magnetic structure having opposite faces defining a magnetic gap and permanent magnet means for generating a magnetic field between said opposite faces of said magnetic gap and two individual coil systems selectively energisable in response to variations of said magnetic field, an armature structure including an armature of magnetisable material having opposite, substantially flat and parallel surfaces and being substantially symmetrical about a central point and a stylus arm carrying said stylus extending from one of said surfaces, and means for mounting said armature structure with said armature movable in said magnetic gap with its substantially parallel surfaces substantially parallel with the opposite faces of said magnetic gap operable to enable tilting of said armature about said central point for varying said magnetic field, said mounting means including an elastic pad located substantially in a zone about said central point and rendering said variations of said magnetic field operable to selectively energize said coil systems in response to oscillations of the armature structure in compliance with the tracking of the stylus to achieve outputs from said coil system corresponding to the individual sound recordings.

11. In an electromechanical transducer of the type having a single stylus adapted to track a record groove having individual sound recordings disposed substantially at right angles relative to each other in combination: a structure having first surface means and second surface means defining a magnetic gap, and permanent magnet means for generating a magnetic field across said magnetic gap, a structure including a mounting member, a stylus arm and a supporting member therefor having opposite substantially parallel surfaces with the stylus arm extending from one end of said surfaces and means for mounting said stylus arm supporting member on said mounting member, including resilient means providing substantially equal response of said stylus arm supporting member in all directions relatively to said mounting member, means for mounting said mounting member on said first surface means of said structure with said stylus arm supporting member in said magnetic gap with its substantially parallel surfaces substantially parallel with the opposite faces of the magnetic gap, two individual coil means in said transducer operable to be energized in response to oscillations of the said stylus arm supporting member in said magnetic gap in compliance with the tracking of the stylus to achieve selective outputs from said coil means corresponding to the individual sound recordings.

12. In an electromechanical transducer of the type having a single stylus adapted to track a record groove having individual sound recordings disposed substantially at right angles relative to each other in combination: a magnetic structure having first surface means and second surface means defining a magnetic gap, permanent magnet means for generating a magnetic field across said magnetic gap, an armature assembly including a mounting member, a substantially flat armature, a stylus arm carrying said stylus rigidly secured to and extending from said armature and mounting means supporting said armature and stylus arm on said mounting member including resilient means providing substantially equal elastic response of said armature relative to said mounting member in all directions, first complementary positioning means on said mounting member of said assembly, second complementary positioning means on said first surface means operable to cooperate with said first complementary positioning means to position said armature assembly with said armature located in said magnetic gap, two individual coil means in said transducer operable to be energized in response to oscillations of the said stylus arm supporting member in said magnetic gap in compliance with the tracking of the stylus to achieve selective outputs from said coil means corresponding to the individual sound recordings.

13. In an electromechanical transducer of the type having a single stylus adapted to track a record groove having individual sound recordings disposed substantially at right angles relative to each other in combination: a structure having first surface means and second surface means defining a magnetic gap, permanent magnet means for generating a magnetic field across said magnetic gap, an armature assembly including a mounting member, a substantially flat armature being substantially symmetrical about a central point, a stylus arm carrying said stylus rigidly secured to and extending from said armature and mounting means supporting said armature and stylus arm on said mounting member including an elastic pad located between said armature and said mounting member and a cord anchored in said stylus arm as well as said mounting member and extending through said elastic pad slightly compressing the same to provide by means of said elastic pad substantially equal elastic response of said armature relative to said mounting member in all directions, first complementary positioning means on said mounting member of said assembly, second complementary positioning means on said first surface means operable to cooperate with said first complementary positioning means to position said armature assembly with said armature located in said magnetic gap, two individual coil means in said transducer operable to be energized in response to oscillations of the said stylus arm supporting member in said magnetic gap in compliance with the tracking of the stylus to achieve selective outputs from said coil means corresponding to the individual sound recordings.

14. In an electromechanical transducer of the type having a single stylus adapted to track a record groove having individual sound recordings disposed substantially at right angles relative to each other in combination: a structure including first and second surface means defining a magnetic gap, permanent magnet means for generating a magnetic field across said magnetic gap, a coil and stylus arm structure comprising a rigid three-dimensional coil supporting member, the opposite surfaces of which are substantially parallel, a stylus arm carrying said stylus and being rigidly secured to said rigid member extending from one surface thereof, and a pair of coils wound on said rigid member substantially perpendicular to each other, and mounting means including resilient means effectively providing substantially equal elastic response of the coil structure in all directions for mounting said coil and stylus arm structure with said coil supporting member in said magnetic gap and with opposite surfaces of said coil supporting member substantially parallel with the surfaces of said magnetic gap, and with the coil turns in planes substantially parallel to the flux lines of the magnetic field to energize said coils in response to oscillations of said rigid member in compliance with the tracking of the stylus to achieve outputs from said coils corresponding to the individual sound recordings.

15. In an electromechanical transducer of the type having a single stylus adapted to track a record groove having individual sound recordings disposed substantially at right angles relative to each other in combination: a structure including first and second surface means defining a magnetic gap, permanent magnet means for generating a magnetic field across said magnetic gap, a coil and stylus arm structure comprising a rigid three-dimensional coil supporting member of magnetizable material, the opposite surfaces of which are substantially parallel, a stylus arm carrying said stylus and being rigidly secured to said rigid member extending from one surface thereof, and a pair of coils wound on said rigid member substantially perpendicular to each other, and mounting means including resilient means providing substantially equal elastic response of the coil structure in all directions for mounting said coil and stylus arm structure with said coil supporting member in said magnetic gap and with opposite surfaces of said coil supporting member substantially parallel with the surfaces of said magnetic gap, and with the coil turns in planes substantially parallel to the flux lines of the magnetic field to energize said coils in response to oscillations of said rigid member in compliance with the tracking of the stylus to achieve outputs from said coils corresponding to the individual sound recordings.

16. In an electromechanical transducer of the type having a single stylus adapted to track a record groove having individual sound recordings disposed substantially at right angles relative to each other in combination: a structure including first and second surface means defining a magnetic gap, permanent magnet means for generating a magnetic field across said magnetic gap, an assembly including a mounting member, a coil and stylus arm structure comprising a rigid three-dimensional coil supporting member, the opposite surfaces of which are substantially parallel, a stylus arm carrying said stylus and being rigidly secured to said rigid member extending from one surface thereof, and a pair of coils wound on said rigid member substantially perpendicular to each other, and means for mounting said coil and stylus arm structure on said mounting member including resilient means providing substantially elastic response of the coil structure in all directions, and means for supporting said mounting member on said first surface means in mutual position relatively thereto to position said coil and stylus arm structure with said coil supporting member in said magnetic gap with opposite surfaces of said coil supporting member substantially parallel with the surfaces of said magnetic gap, and with the coil turns in planes substantially parallel to the flux lines of the magnetic field to energize said coils in response to oscillations of said rigid member in compliance with the tracking of the stylus to achieve outputs from said coils corresponding to the individual sound recordings.

17. As an article of manufacture for use in an electromechanical transducer having a magnetic structure including first and second surfaces defining a magnetic gap, means for generating a magnetic field across said magnetic gap and individual coil means operable to be energized in response to variations of said magnetic field: a stylus structure having a single stylus, a stylus arm carrying said stylus, an armature carrying said stylus arm, a mounting member, means supporting said armature and stylus arm on said mounting member including resilient means providing substantially equal elastic response of said armature relatively to said mounting member, and means on said mounting member operable to support said stylus structure on the first surface of said magnetic structure with said armature located in said magnetic gap thereof to provide individual outputs from said coil means in response to oscillations of said armature in compliance with individual sound recordings disposed substantially at right angles relative to each other in a record groove tracked by said stylus.

18. As an article of manufacture for use in an electromechanical transducer having a magnetic structure including faces defining a magnetic gap, permanent magnet means for generating a magnetic field across said magnetic gap and individual coil means operable to be energized in response to variations of said magnetic field: a stylus structure having a single stylus, a stylus arm carrying said stylus, an armature carrying said stylus arm and being substantially symmetrical with respect to a central point, a mounting member, means including an elastic pad between said mounting member and said armature located substantially in a zone about said central point and means extending through said elastic pad anchored in the parts on both sides thereof operable to slightly compress said elastic pad to provide substantially equal elastic response of said armature relative to said mounting member, and means on said mounting member operable to support said stylus structure on said magnetic structure with said armature located in said magnetic gap thereof to provide individual outputs from said coil means in response to oscillations of said armature in compliance with individual sound recordings disposed substantially at right angles relative to each other in a record groove tracked by said stylus.

19. As an article of manufacture for use in an electromechanical transducer having a magnetic structure including faces defining a magnetic gap, permanent magnet means for generating a magnetic field across said magnetic gap, a coil and stylus structure having a single stylus, a stylus arm carrying said stylus, a rigid three-dimensional member carrying said stylus arm extending from one surface of said rigid member, a pair of coils wound on said rigid member substantially perpendicular to each other and with the coil turns in planes substantially perpendicular to the surface of said rigid member from which said stylus arm extends, a mounting member, means supporting said coil and stylus structure on said mounting member including resilient means providing substantially equal elastic response of said coil and stylus structure relatively to said mounting member, and means on said mounting member operable to support said stylus structure on said magnetic structure with said coil and stylus structure located in said magnetic gap thereof to provide individual outputs from said coils of said coil and stylus structure in response to oscillations of said coil and stylus structure in compliance with individual sound recordings disposed substantially at right angles relative to each other in a record groove tracked by said stylus.

20. As an article of manufacture for use in an electromechanical transducer having a magnetic structure including faces defining a magnetic gap, permanent magnet means for generating a magnetic field across said magnetic gap, a coil and stylus structure having a single stylus, a stylus arm carrying said stylus, a rigid three-dimensional member carrying said stylus arm extending from one surface of said rigid member, a pair of coils wound on said rigid member substantially perpendicular to each other and intersecting at a central point and with the coil turns in planes substantially perpendicular to the surface of said rigid member from which said stylus arm extends, a mounting member, means supporting said coil and stylus structure on said mounting member including an elastic pad between said mounting member and said rigid member located substantially in a zone about said central point and means extending through said elastic pad anchored in the parts on both sides thereof operable to slightly compress said elastic pad to provide substantially equal elastic response of said coil and stylus structure to said mounting member, and means on said mounting member operable to support said stylus structure on said magnetic structure with said coil and stylus structure located in said magnetic gap thereof to provide individual outputs from said coils of said coil and stylus structure in response to oscillations of said coil and stylus structure in compliance with individual sound recordings disposed substantially at right angles relative to each other in a record groove tracked by said stylus.

References Cited by the Examiner

UNITED STATES PATENTS

| | | | |
|---|---|---|---|
| 2,025,388 | 12/1935 | Henning. | |
| 2,640,888 | 6/1953 | Combs | 179—100.41 |
| 3,077,521 | 2/1963 | Ahrens et al. | 179—100.41 |
| 3,184,555 | 5/1965 | Marshall | 179—100.41 |

BERNARD KONICK, *Primary Examiner.*

A. I. NEUSTADT, *Assistant Examiner.*